(12) United States Patent
Kamata et al.

(10) Patent No.: US 11,386,724 B2
(45) Date of Patent: Jul. 12, 2022

(54) CONTROL DEVICE, A CONTROL METHOD, AND A NON-TRANSITORY COMPUTER READABLE MEDIUM STORING A CONTROL PROGRAM OF A DOOR LOCK OF A VEHICLE

(71) Applicant: Toyota Jidosha Kabushiki Kaisha, Toyota (JP)

(72) Inventors: Nobuhide Kamata, Susono (JP); Yasuo Uehara, Gotemba (JP); Nozomu Hatta, Susono (JP); Shunsuke Tanimori, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 149 days.

(21) Appl. No.: 16/713,687

(22) Filed: Dec. 13, 2019

(65) Prior Publication Data

US 2020/0193734 A1    Jun. 18, 2020

(30) Foreign Application Priority Data

Dec. 18, 2018  (JP) .............................. JP2018-236504

(51) Int. Cl.
  *G07C 5/02*   (2006.01)
  *G05D 1/02*   (2020.01)
  *G06V 40/10*  (2022.01)

(52) U.S. Cl.
  CPC ............. *G07C 5/02* (2013.01); *G05D 1/0274* (2013.01); *G05D 1/0276* (2013.01); *G06V 40/10* (2022.01)

(58) Field of Classification Search
  CPC .......... G07C 5/02; G07C 5/08; G05D 1/0276; G05D 1/0274; G06K 9/00362; G06K 9/00791
  See application file for complete search history.

(56) References Cited

U.S. PATENT DOCUMENTS

| 6,606,898 B1 * | 8/2003 | Abe .................... G01M 15/102 |
| | | 73/23.31 |
| 2017/0052537 A1 * | 2/2017 | Salinas ................. H04L 67/125 |
| 2017/0369044 A1 | 12/2017 | Otake |
| 2018/0113474 A1 * | 4/2018 | Koda ................... G05D 1/0274 |

(Continued)

FOREIGN PATENT DOCUMENTS

| CN | 105329167 A | * | 2/2016 |
| JP | 2017-182137 A | | 10/2017 |

(Continued)

*Primary Examiner* — Rodney A Butler
(74) *Attorney, Agent, or Firm* — Dinsmore & Shohl LLP

(57) ABSTRACT

The control device of a vehicle configured to: control a door lock mechanism locking a door of the vehicle; make the vehicle stop when the vehicle is in a specific abnormal state; and determine if it is safe for a user of the vehicle to get off the vehicle from each door of the vehicle while the vehicle is stopped when the vehicle is in the specific abnormal state, wherein the control device controls the door lock mechanism such that a door is maintained in a locked state while the vehicle is being driven and while the vehicle is stopped when the vehicle is not in the specific abnormal state, unlocks the door determined to be safe to get off by the door lock mechanism, and does not unlock the door determined to not be safe to get off when the vehicle is stopped when entering the specific abnormal state.

2 Claims, 11 Drawing Sheets

(56) References Cited

U.S. PATENT DOCUMENTS

2018/0338229 A1* 11/2018 Nemec ................. G05D 1/0088
2019/0103028 A1    4/2019 Kobayashi et al.
2019/0377350 A1* 12/2019 Hunt .................... G05D 1/0214
2020/0018100 A1*  1/2020 Aoi ........................ E05B 77/00

FOREIGN PATENT DOCUMENTS

| JP | 2017-226373 | 12/2017 |
| JP | 2019-217924 A | 12/2019 |

* cited by examiner

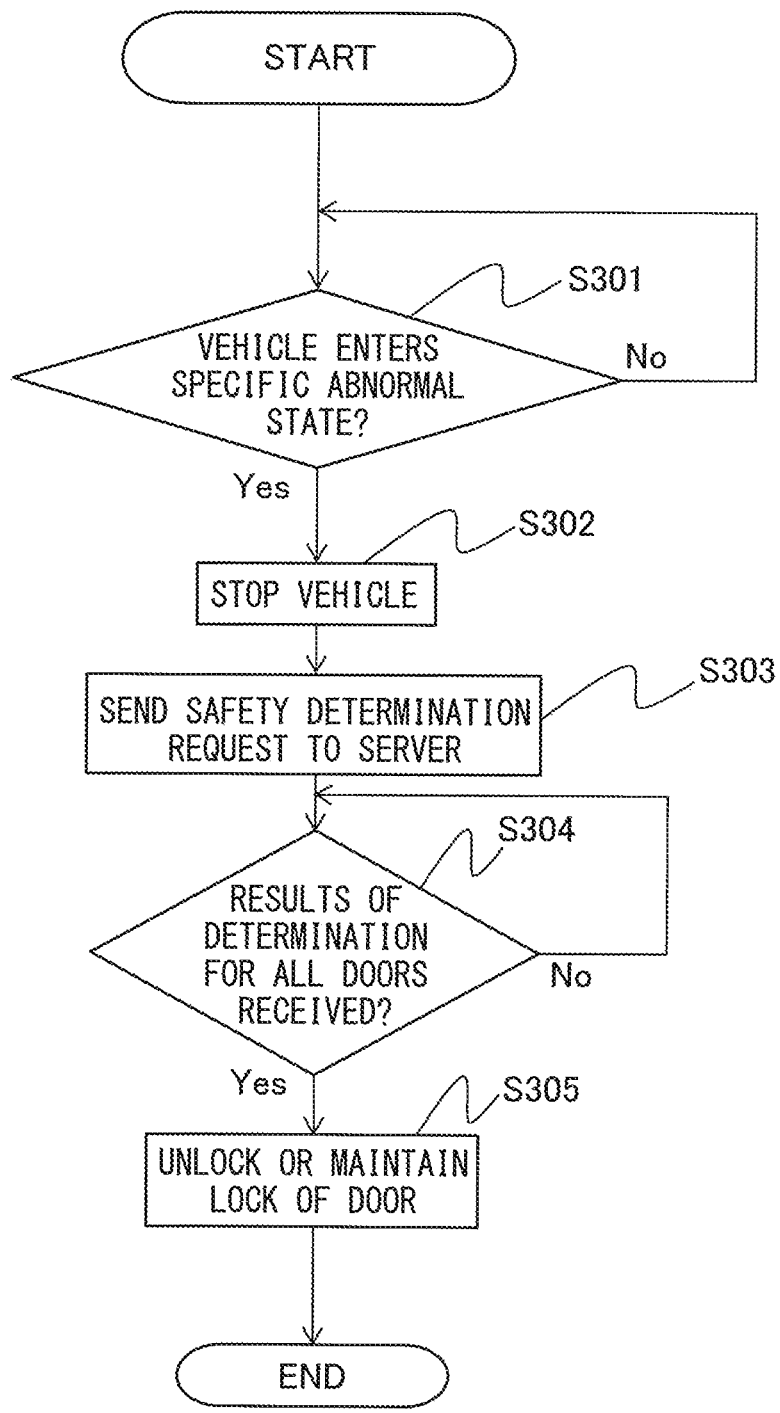

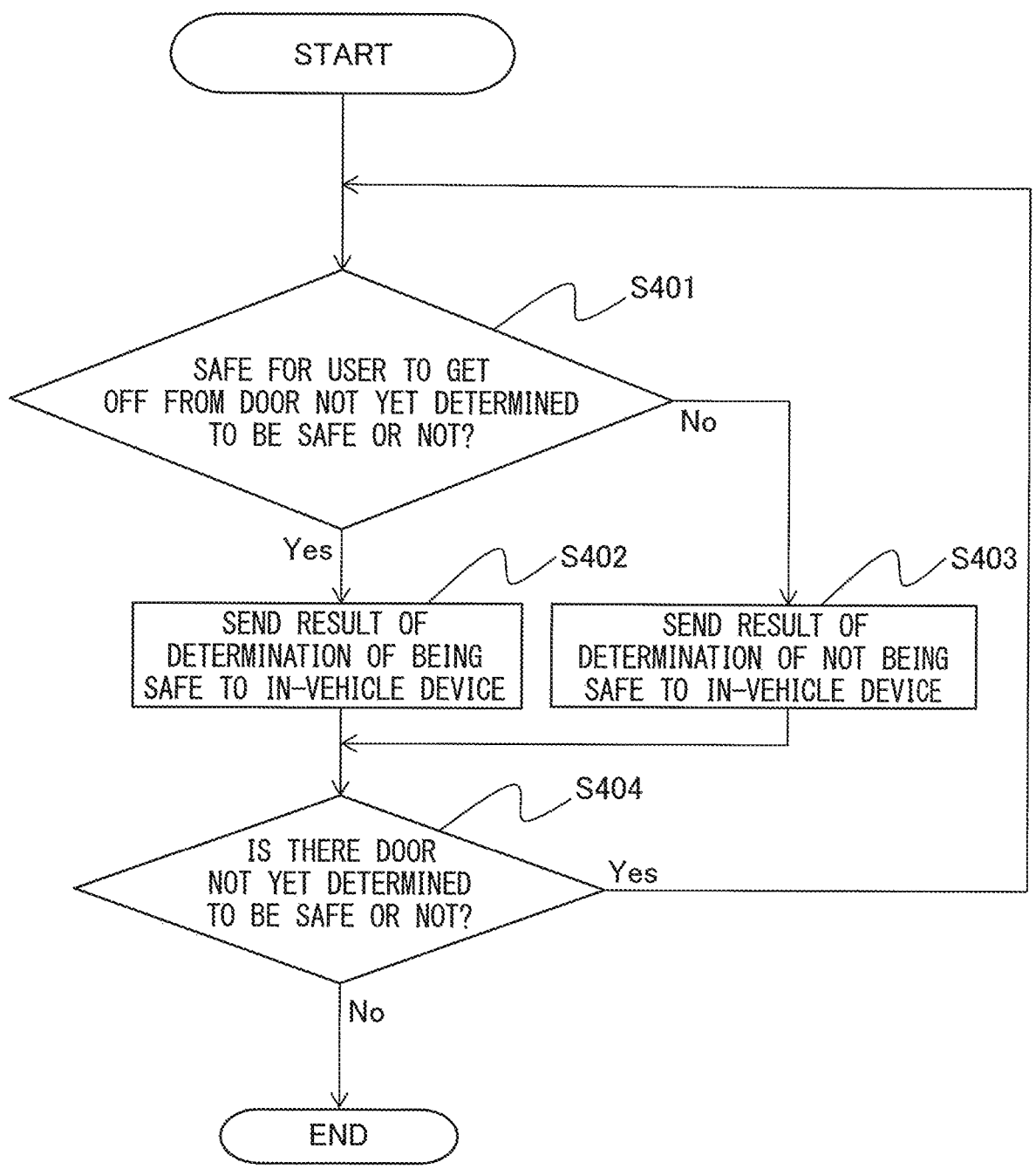

CONTROL DEVICE, A CONTROL METHOD, AND A NON-TRANSITORY COMPUTER READABLE MEDIUM STORING A CONTROL PROGRAM OF A DOOR LOCK OF A VEHICLE

CROSS-REFERENCE TO RELATED APPLICATION

This application claims priority to Japanese Patent Application No. 2018-236504, filed on Dec. 18, 2018, the entire contents of which are herein incorporated by reference.

FIELD

The present disclosure relates to a control device, control method, and control program of a vehicle.

BACKGROUND

In recent years, technology for using autonomously driven vehicles as vehicles utilized for taxi services, bus services, rideshare services, and other mobility services has been proposed (for example, see PTL 1).

For example, in the vehicle driving system described in PTL 1, each time a request for utilization is acquired from a terminal of a user, a driving control center prepares a driving plan in accordance with the request for utilization and provides the prepared driving plan to the terminal of the user and to a vehicle. The vehicle is driven by autonomous operation in accordance with this driving plan.

On the other hand, technology for operating the door lock of a vehicle if some abnormality occurs during driving of the vehicle has been proposed. For example, PTL 2 describes a vehicle having a driving assistance function such as control of the distance to a vehicle in front, which is configured to automatically stop the vehicle a automatically unlock the door when the driver is in an abnormal state losing the ability to operate the vehicle.

CITATIONS LIST

Patent Literature

[PTL 1] Japanese Unexamined Patent Publication No. 2017-182137
[PTL 2] Japanese Unexamined Patent Publication No. 2017-226373

SUMMARY

Technical Problem

In this regard, in an autonomously driven vehicle, for example, when the vehicle enters a specific abnormal state, for example when the various sensors used for automated driving control of the vehicle malfunction, sufficient information for continuing autonomous driving is no longer provided to the vehicle. For this reason, when the vehicle is in such a specific abnormal state, it is necessary to make the vehicle stop and prompt the user utilizing the mobility service to get off the vehicle.

However, if the door of the vehicle ends up being automatically unlocked along with the vehicle being stopped, for example, if the user gets off the vehicle without confirming the safety of the surroundings of the vehicle, there is the danger of the user being hit by another vehicle coming up from behind right after the user gets off the vehicle or another accident occurring.

In view of the above problem, the present disclosure intends to secure safety when a user gets off from a vehicle when the vehicle is in a specific abnormal state.

Solution to Problem

The gist of the present disclosure is as follows:

(1) A control device of a vehicle configured to autonomously drive,
the control device of a vehicle comprising:
a door lock control part controlling a door lock mechanism locking a door of the vehicle;
an abnormal state driving control part making the vehicle stop when the vehicle is in a specific abnormal state; and
a safety determination part determining if it is safe for a user of the vehicle to get off the vehicle from each door of the vehicle while the vehicle is stopped by the abnormal state driving control part,
wherein the door lock control part controls the door lock mechanism such that a door is maintained in a locked state while the vehicle is being driven and while the vehicle is stopped in the case where the vehicle is not in the specific abnormal state, and
the door lock control part unlocks the door determined by the safety determination part to be safe to get off by the door lock mechanism, and does not unlock the door determined by the safety determination part to not be safe to get off, when the vehicle is stopped by the abnormal state driving control part.

(2) The control device of a vehicle according to claim 1, further comprising a notifying part notifying the user of an unlocked door while the vehicle is stopped by the abnormal state driving control part.

(3) The control device of a vehicle according to claim 1 or 2, wherein the safety determination part determines if it is safe to get off based on position information and map information relating to the stopping position of the vehicle and surrounding information indicating the situation around the vehicle.

(4) The control device of a vehicle according to any one of claims 1 to 3, further comprising an automated driving control part making the vehicle be autonomously driven, the automated driving control part comprising the abnormal state driving control part.

(5) A control method of a vehicle configured to autonomously drive,
the control method comprising steps of:
rendering a door of the vehicle a locked state while the vehicle is being driven and while the vehicle is stopped in the case where the vehicle is not in the specific abnormal state;
making the vehicle stop when the vehicle enters the specific abnormal state;
determining if it is safe for a user of the vehicle to get off the vehicle from each door of the vehicle while the vehicle is stopped in the case where the vehicle is in the specific abnormal state; and
not unlocking the door determined, at the step of the determining, to not be safe to get off and unlocking the door determined, at the step of the determining, to be safe to get off, when the vehicle is stopped when entering the specific abnormal state.

(6) A control program of a vehicle configured to autonomously drive, the control program cause a processor perform to steps of:

rendering a door of the vehicle a locked state while the vehicle is being driven and while the vehicle is stopped in the case where the vehicle is not in the specific abnormal state;

making the vehicle stop when the vehicle enters the specific abnormal state;

determining if it is safe for a user of the vehicle to get off the vehicle from each door of the vehicle while the vehicle is stopped in the case where the vehicle is in the specific abnormal state, and not unlocking the door determined, at the step of the determining, to not be safe to get off and unlocking the door determined, at the step of the determining, to be safe to get off, when the vehicle is stopped when entering the specific abnormal state.

(7) A control system of a vehicle comprising an in-vehicle device mounted in a vehicle configured to autonomously drive and a server, the in-vehicle device comprising:

a door lock control part controlling a door lock mechanism locking a door of the vehicle; and an abnormal state driving control part making the vehicle stop when the vehicle is in a specific abnormal state, and the server comprising a safety determination part sending the in-vehicle device a result of determination of if it is safe for a user of the vehicle to get off the vehicle from each door of the vehicle while the vehicle is stopped by the abnormal state driving control part, wherein the door lock control part controls the door lock mechanism such that a door is maintained in a locked state while the vehicle is being driven and while the vehicle is stopped in the case where the vehicle is not in the specific abnormal state, and when the vehicle is stopped by the abnormal state driving control part, the door lock control part unlocks the door determined by the safety determination part to be safe to get off by using the door lock mechanism, and does not unlock the door determined by the safety determination part to not be safe to get off, based on the result of determination sent by the safety determination part.

Advantageous Effects

According to the present disclosure, it becomes possible to secure safety when a user gets off from a vehicle when the vehicle is in a specific abnormal state.

BRIEF DESCRIPTION OF DRAWINGS

FIG. 11 is a flow chart showing a control routine of an in-vehicle device 3 in a control system of a vehicle according to the third embodiment.

FIG. 12 is a flow chart showing a control routine in a control device of a server 30 in the control system of a vehicle according to the third embodiment.

DETAILED DESCRIPTION

Figure 1:
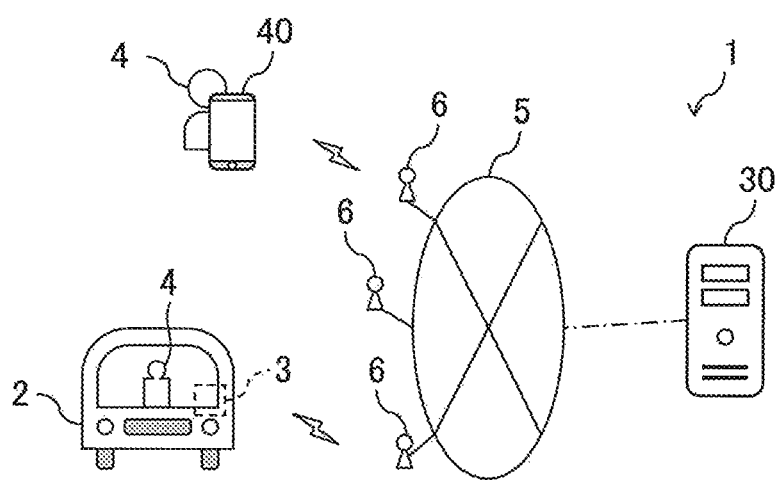
FIG. 1 is a view showing one example of the configuration of a user transport system according to a first embodiment.

Below, referring to the drawings, embodiments of the present disclosure will be explained in detail. Note that, in the following explanation, similar constituent elements will be assigned the same reference notations.

First Embodiment

Overall Configuration of User Transport System

FIG. 1 is a view showing one example of a user transport system 1 according to the present embodiment. The user transport system 1 provides a taxi service, bus service, rideshare service, or other mobility service. As shown in FIG. 1, the user transport system 1 according to the present embodiment includes an in-vehicle device 3 mounted in a vehicle 2, a server 30, and a mobile terminal 40. The in-vehicle device 3 is one example of a control device of the vehicle according to the present embodiment.

In the present embodiment, the vehicle 2 is configured to be autonomously driven. The vehicle 2 is an automated driving vehicle providing a taxi service, bus service, rideshare service, or other mobility service by this autonomous driving. In particular, in the present embodiment, the vehicle 2 is an automated unmanned driven vehicle in which no driver or other attendant is present.

The server 30 is, for example, connected through a not shown gateway etc. to a network 5. Further, the in-vehicle device 3 of the vehicle 2 and the mobile terminal 40 are, for example, connected with the network 5 through a wireless base station 6 etc.

Overall Configuration of Vehicle

Figure 2:
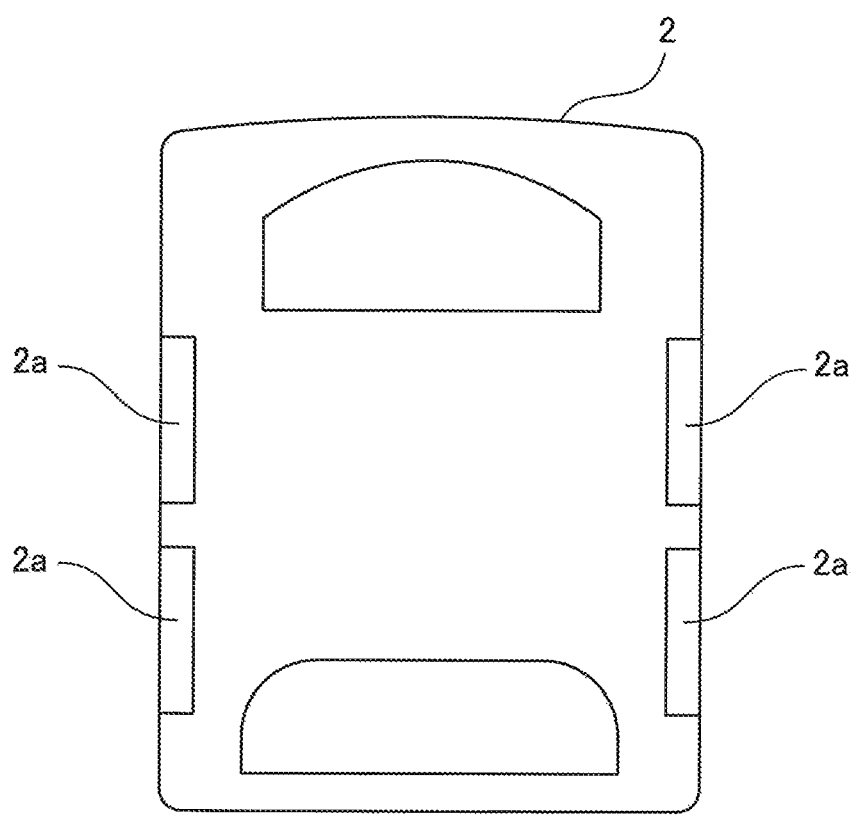
FIG. 2 is a schematic top view of a vehicle according to the present embodiment.

FIG. 2 is a schematic top view of the vehicle 2 according to the present embodiment. As shown in FIG. 2, the vehicle 2 has a plurality of doors 2a for users 4 to get on or off the vehicle 2. The doors 2a are, for example, configured to automatically be opened or closed when the users 4 get on or off the vehicle 2.

Figure 3:
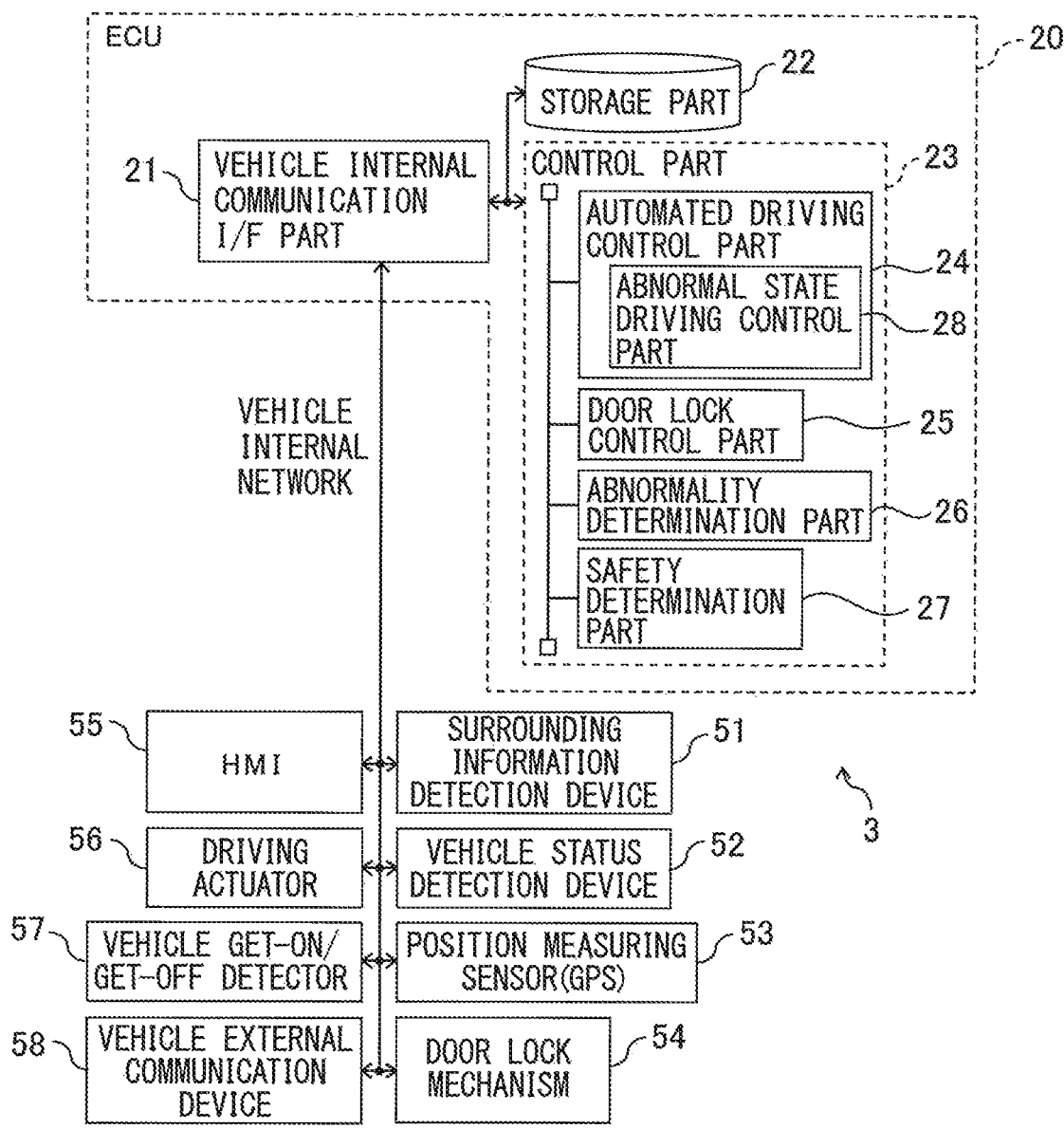
FIG. 3 is a schematic view of the configuration of an in-vehicle device according to the first embodiment.

FIG. 3 is a schematic view of the configuration of the in-vehicle device 3 of the vehicle 2 according to the present embodiment. As shown in FIG. 3, the in-vehicle device 3 of the vehicle 2 includes components connected to each other through a vehicle internal network such as an electronic control unit (ECU) 20, surrounding information detection device 51, vehicle status detection device 52, position measuring sensor 53, door lock mechanism 54, HMI (human machine interface) 55, driving actuator 56, vehicle get-on/get-off detector 57, and a vehicle external communication device 58. The vehicle internal network is, for example, a network based on the CAN (Controller Area Network) standard.

The ECU 20 has parts connected with each other through signal wires such as a vehicle internal communication interface (I/F) part 21, storage part 22, and control part 23. The vehicle internal communication I/F part 21 is a communication I/F circuit for the ECU 20 to communicate with other in-vehicle equipment of the vehicle 2 through the vehicle internal network.

The storage part 22, for example, can be provided with a ROM (read only memory) or RAM (random access memory) etc. The storage part 22 stores various programs and various data (for example, map information, various parameters, various threshold values, etc.) used for processing by the control part 23.

The control part 23, for example, can be a processor having a CPU and its peripheral circuits etc. The control part 23 can run the various programs stored in the storage part 22 to thereby perform the various control of the vehicle 2.

Further, the control part 23 includes a plurality of functional modules loaded by programs run on the processor of the control part 23. As shown in FIG. 3, in the present embodiment, the control part 23 includes, as functional modules, an automated driving control part 24 forming part of the user transport system 1, a door lock control part 25, an abnormality determination part 26, and a safety determination part 27.

The automated driving control part 24 outputs control signals for automatic control of driving of the vehicle 2 based on signals output from the surrounding information detection device 51, vehicle status detecting device 52, and position measuring sensor 53 and the driving plan of the vehicle 2. The automated driving control part 24 performs processing relating to the vehicle 2 in the user transport processing relating to the mobility service explained later using FIG. 6.

Further, the automated driving control part 24 includes an abnormal state driving control part 28. The abnormal state driving control part 28 outputs a control signal to the driving actuator 56 to make the vehicle 2 stop when the later explained abnormality determination part 26 determines that the vehicle 2 has become a specific abnormal state. Further, when stopping the vehicle, the abnormal state driving control part 28 outputs a control signal to the driving actuator 56 to for example make the vehicle 2 pull over to a sidewalk or road side and otherwise perform control for avoiding risk.

The door lock control part 25 controls door lock mechanism 54 locking door 2a of the vehicle 2. Specifically, the door lock control part 25 outputs to the door lock mechanism 54 a door lock signal for locking door 2a of the vehicle 2 or a door unlock signal for unlocking door 2a of the vehicle 2. The door lock mechanism 54 locks or unlocks the door 2a of the vehicle 2 in accordance with the door lock signal or the door unlock signal.

Specifically, for example, after a user 4 gets on the vehicle 2 and closes a door 2a, the door lock control part 25 outputs a door lock signal to a door lock mechanism 54 for locking that door 2a. Along with this, the door 2a is locked by the door lock mechanism 54. As a result, the door 2a of the vehicle 2 is maintained in the locked state while the vehicle 2 is driving, while it is temporarily stopped, while it is waiting for a traffic light to change, etc. Further, the door lock control part 25 outputs a door unlock signal to a door lock mechanism 54 for unlocking a door 2a when a user 4 gets on or gets off the vehicle 2. Along with this, the door 2a is unlocked by that door lock mechanism 54.

The abnormality determination part 26 determines if the vehicle 2 has entered a specific abnormal state (explained later). The safety determination part 27 determines if it is safe for a user 4 to get off from a door 2a for each door 2a of the vehicle when the vehicle is stopped by the abnormal state driving control part 28.

The surrounding information detection device 51 detects surrounding information indicating the surrounding circumstances of the vehicle 2 for autonomous driving of the vehicle 2. This surrounding information includes information on a white line of a road, other vehicles, pedestrians, motorcycles, bicycles, buildings, road signs, traffic lights, obstacles, etc. The surrounding information detection device 51 is connected to the ECU 20 through the vehicle internal network. The output of the surrounding information detection device 51 is sent to the ECU 20. For example, the surrounding information detection device 51 includes an outside camera, milliwave radar, LIDAR (Laser Imaging Detection And Ranging), ultrasonic wave sensor, or other detection device. The outside camera captures the outside of the vehicle 2 and generates images of the surroundings.

The vehicle status detection device 52 detects the state of the vehicle 2 for autonomous driving of the vehicle 2. The vehicle status detection device 52 is connected through the vehicle internal network to the ECU 20. The output of the vehicle status detection device 52 is sent to the ECU 20. For example, the vehicle status detection device 52 includes a vehicle speed sensor, yaw rate sensor, door operation sensor, etc.

The position measuring sensor 53 generates position information indicating the current location of the vehicle 2 for autonomous driving of the vehicle 2. The position information generated by the position measuring sensor 53 is output to the ECU 20 for the automated driving control part 24 to automatically control driving of the vehicle 2 and, in addition, is sent through the network 5 to the server 30 so as to enable the server 30 to grasp the current location of the vehicle 2. The position measuring sensor 53 is, for example, a GPS (global positioning system) of a car navigation system installed in the vehicle 2.

The door lock mechanisms 54 lock or unlock door 2a of the vehicle 2 in accordance with door lock signal or door unlock signal output from the door lock control part 25.

The HMI 55 is interface for transferring information between user 4 and the ECU 20. The HMI 55 includes, for example, display for displaying information, speaker for generating sound, operating button or touch screen for user to perform input operation, microphone for receiving the voices of the user, etc. An HMI 55 is, for example, provided for each seat of the vehicle 2 and for each door 2a.

The driving actuator 56 is a device for controlling driving of the vehicle 2. The driving actuator 56 controls the driving force of the vehicle 2, the braking force given to the vehicle 2, and the steering action of the vehicle 2 in accordance with a control signal output from the automated driving control part 24.

The vehicle get-on/get-off detector 57 outputs a detection signal of vehicle get on or get off to the ECU 20 when detecting user 4 getting on or getting off the vehicle. The vehicle get-on/get-off detector 57, for example, is respectively provided near the door 2a inside the vehicle and outside the vehicle. The vehicle get-on/get-off detector 57, for example, can communicate with the mobile terminal 40 of a user 4 by near field communication to detect the user 4 getting on or getting off the vehicle.

The vehicle external communication device 58 is an in-vehicle terminal having a wireless communication function. The vehicle external communication device 58, for example, is an in-vehicle navigation system, DCM (data communication module), fifth generation (5G) communication device, etc. The vehicle external communication device 58 is connected to the network 5 through a wireless base station 6.

Configuration of Server

Figure 4:
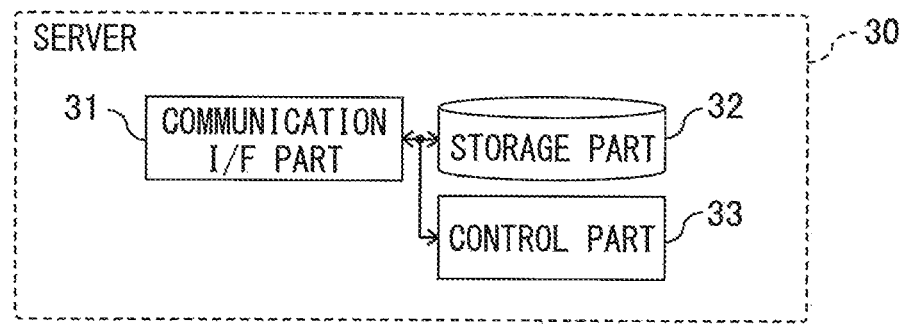
FIG. 4 is a schematic view of the configuration of a server according to the first embodiment.

FIG. 4 is a schematic view of the configuration of the server 30 according to the present embodiment. As shown in FIG. 4, the server 30 includes components connected with each other through signal wires such as a communication I/F part 31, storage part 32, and control part 33.

The communication I/F part 31 is one example of a communicating part and is a communication I/F circuit for connecting the server 30 with the network 5. The communication I/F part 31 is configured to be able to communicate with in-vehicle devices 3 of the vehicle 2 and mobile terminals 40 through the network 5.

The storage part 32, for example, can include a ROM (read only memory) or a RAM (random access memory) etc. The storage part 32 stores various types of programs and various types of data used for processing by the control part 33 (for example, map information, various types of parameters, various types of threshold values, etc.).

The control part 33, for example, can be a processor having a CPU and its peripheral circuits etc. The control part 33 can run various types of programs stored in the storage part 32 to thereby perform the various types of control of the server 30. The control part 33 performs processing relating to the server 30 in the user transport processing relating to the mobility service explained later using FIG. 6.

Configuration of Mobile Terminal

Figure 5:
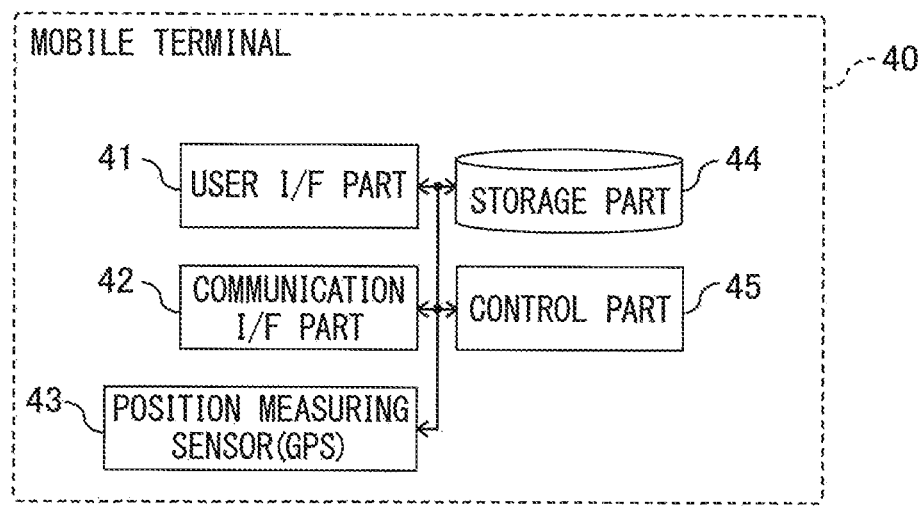
FIG. 5 is a schematic view of the configuration of a mobile terminal according to the first embodiment.

FIG. 5 is a schematic view of the configuration of a mobile terminal 40 according to the present embodiment. The mobile terminal 40 includes a user I/F part 41, communication I/F part 42, position measuring sensor 43, storage part 44, and control part 45. The mobile terminal 40 is possessed by the user 4 and can move together with the user 4.

The user I/F part 41, for example, has a touch panel display. The user I/F part 41 generates a signal corresponding to operation of the user on the mobile terminal 40 (for example, starting up application relating to mobility service, agreeing to share a ride with other users, etc.) and outputs the signal to the control part 45. Further, the user I/F part 41 displays various display use information received from the control part 45 (for example, message proposing sharing ride with other user, license plate of vehicle to be picked up by and other information for identifying the vehicle, the meet-up place, the meet-up time, etc.).

The communication I/F part 42 is one example of a communicating part and is a communication I/F circuit for connecting the mobile terminal 40 with the network 5. The communication I/F part 42 is configured to be able to communicate with an in-vehicle device 3 of a vehicle 2 and the server 30 through the network 5.

The position measuring sensor 43 generates position information indicating the current location of the mobile terminal 40 and outputs it to the control part 45. The position measuring sensor 43 is, for example, a GPS. The position measuring sensor 43 generates position information indicating the current location of the mobile terminal 40 and outputs it to the control part 45.

The storage part 44 can, for example, include a ROM (read only memory) or RAM (random access memory) etc. The storage part 44 stores various programs and various data (for example, various parameters, various threshold values, etc.) used for processing by the control part 45.

The control part 45, for example, can be a processor having a CPU and its peripheral circuits etc. The control part 45 can run the various programs stored in the storage part 44 to thereby perform the various controls of the mobile terminal 40. The control part 45 performs processing relating to the mobile terminal 40 in the user transport processing relating to the mobility service explained later using FIG. 6.

Summary of User Transport Processing

Figure 6:
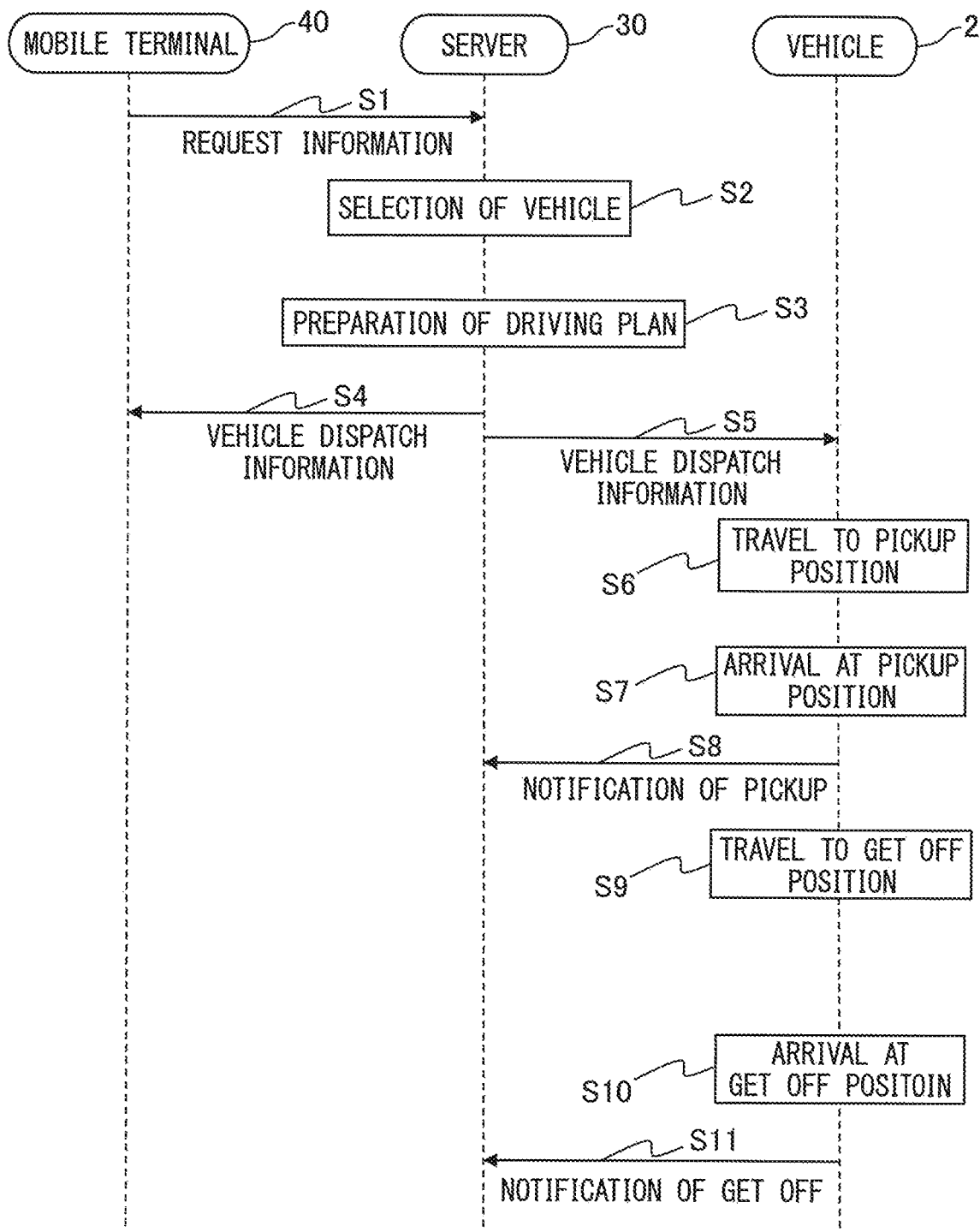
FIG. 6 is a sequence diagram showing one example of processing for transport of a user in a user transport system according to the first embodiment.

FIG. 6 is a sequence diagram showing one example of user transport processing relating to a mobility service in the user transport system 1 according to the present embodiment. In the sequence diagram shown in FIG. 6, communication between the server 30 and an in-vehicle device 3 of a vehicle 2 and a mobile terminal 40 is performed through the network 5.

A user utilizing a mobility service uses the mobile terminal 40 etc. to register user information etc. in advance. The registered user information is stored in the storage part 32 of the server 30 for each user. When the user requests usage of the mobility service, that is, when the user requests arrangement of a vehicle 2, the user operates the mobile terminal 40 to enter request information into the mobile terminal 40. The request information is, for example, entered on a mobility service application installed in the mobile terminal 40.

If the user 4 desiring to utilize the mobility service operates the mobile terminal 40 he or she carries to enter request information in the mobile terminal 40, at step S1, the mobile terminal 40 sends the request information to the server 30. The request information, for example, includes the current location of the user, the destination of the user, identification information of the user (for example, the registration number of the user etc.), information of accompanying passengers (number of passengers being picked up etc.), whether ride sharing with other persons would be permitted, etc. Further, the current location and destination of the user 4 are, for example, designated by a combination of the name of the facility, address, or latitude and longitude. Note that, the request information may include the desired pickup position of the user 4 instead of the current location of the user 4.

If the server 30 receives request information from the user 4 through the mobile terminal 40, at step S2, the server 30 selects a vehicle 2 suitable for transport of the user 4. That is, the server 30 matches the user with a vehicle 2. A vehicle 2 suitable for transport of the user is, for example, a vehicle 2 which is standing by closest to the current location. Note that, if the user 4 permits ride sharing with another person, a vehicle 2 which another user is in the middle of using may also be selected.

At step S3, the server 30 prepares a driving plan for transporting the user 4. The driving plan includes the pickup position where the user 4 will be picked up by the vehicle 2, the get-off position where the user 4 will be gotten off by the vehicle 2, the estimated time of arrival at the pickup position, the driving route to the get-off position, the estimated time of arrival at the get-off position, etc.

At step S4, the server 30 sends the vehicle dispatch information to the mobile terminal 40. The vehicle dispatch information sent to the mobile terminal 40 includes the pickup position, the get-off position, the estimated time of arrival at the pickup position, the driving route to the get-off position, the estimated time of arrival at the get-off position, identification information of the vehicle 2 (license plate number, model of vehicle, color, etc.), any ride sharing with other persons, etc. Further, at step S5, the server 30 sends the vehicle dispatch information to a vehicle 2. The vehicle dispatch information sent to the vehicle 2 includes the pickup position, get-off position, driving route to the get-off position, identification information of the user, etc.

At step S6, if the in-vehicle device 3 of the vehicle 2 receives vehicle dispatch information from the server 30, the automated driving control part 24 controls the vehicle 2 for automated driving whereby the vehicle 2 starts to travel to the pickup position. After that, at step S7, the vehicle 2 arrives at the pickup position and the vehicle 2 stops. After stopping, for example, if the user 4 brings the mobile terminal 40 close to a vehicle get-on/get-off detector 57 provided outside of the vehicle for near field communication, the door lock control part 25 outputs a door unlock signal. Receiving this door unlock signal, the door lock mechanism 54 unlocks that door 2a of the vehicle 2. After that, the door 2a of the vehicle 2 is automatically opened.

If the user 4 gets on the dispatched vehicle 2 and for example brings mobile terminal 40 close to a vehicle get-on/get-off detector 57 provided inside of the vehicle for near field communication, at step S8, the in-vehicle device 3 of the vehicle 2 detects the user 4 getting on the vehicle 2 based on the detection signal output from the vehicle get-on/get-off detector 57 and notifies this to the server 30. Note that, instead of the in-vehicle device 3 of the vehicle 2 notifying that the user 4 has gotten on the vehicle 2, the user 4 himself/herself may notify that he/she has gotten on by operating the mobile terminal 40. Further, in response to the user 4 getting on the vehicle 2 being detected, the door 2a of the vehicle 2 is automatically closed. After the door 2a of the vehicle 2 is closed, the door lock control part 25 outputs a door lock signal. Receiving the door lock signal, the door lock mechanism 54 locks that door 2a of the vehicle 2.

At step S9, the automated driving control part 24 of the in-vehicle device 3 controls the vehicle 2 for automated driving so that the vehicle 2 starts to travel to the get-off position. Further, while the vehicle 2 is traveling to the get-off position, the in-vehicle device 3 of the vehicle 2, for example, periodically sends position information indicating the current location of the vehicle 2, surrounding information of the vehicle 2, etc. to the server 30.

After that, at step S10, the vehicle 2 reaches the get-off position and the vehicle 2 stops. After the vehicle 2 reaches the get-off position and stops, the door lock control part 25 outputs a door unlock signal. Receiving this door unlock signal, the door lock mechanism 54 unlocks the door 2a of the vehicle 2. After that, the door 2a of the vehicle 2 is automatically opened.

When the user 4 get off the vehicle 2, for example, if bringing the mobile terminal 40 close to the vehicle get-on/get-off detector 57 provided at the outside of the vehicle for near field communication, at step S11, the in-vehicle device 3 of the vehicle 2 detects the user 4 getting off the vehicle based on the detection signal output from the vehicle get-on/get-off detector 57 and notifies this to the server 30. Note that instead of the in-vehicle device 3 of the vehicle 2 notifying that the user 4 has gotten on the vehicle 2, the user 4 himself/herself may notify that he/she has gotten off by operating the mobile terminal 40. Further, in response to the user 4 getting off the vehicle 2 being detected, the door 2a of the vehicle 2 is automatically closed.

If the above-mentioned such series of actions of service is ended, the vehicle 2 enters a standby state for transport of the next user or travels to a pickup position of the next user.

Problems

In this regard, in a vehicle 2 being autonomously driven, for example, if various sensors used for control of automated driving of the vehicle 2 malfunction etc. or otherwise the vehicle 2 enters a specific abnormal state, sufficient information for autonomous driving can no longer be provided to the vehicle 2. If continuing autonomous driving of the vehicle 2 in that state, an accident etc. is liable to be caused.

Therefore, the abnormal state driving control part 28 makes the vehicle 2 stop if the vehicle 2 enters such a specific abnormal state. Further, the door lock control part 25 outputs a door unlock signal. Receiving this door unlock signal, the door lock mechanism 54 unlocks the door 2a. As a result, if the vehicle 2 enters such a specific abnormal state, the user 4 utilizing the mobility service can get off from the vehicle 2.

However, in such an automated driving vehicle, there is no driver or other attendant present. Therefore, the user 4 of the vehicle 2 exercises his or her own determination to get off the vehicle 2. For this reason, if the door lock control part 25 ends up automatically unlocking all of the doors 2a of the vehicle 2 along with the vehicle 2 stopping, for example, if the user 4 ends up getting off without checking the surroundings of the vehicle 2 for safety, there is the danger of the user 4 being struck by another vehicle coming up from the rear right after getting off the vehicle or other accidents happening.

Door Lock Control Based on Safety at Time of Exiting Vehicle

Therefore, in the present embodiment, the safety determination part 27 determines if it is safe for the user 4 to get off from a door 2a for each door 2a of the vehicle 2 when the vehicle is stopped by the abnormal state driving control part 28. Further, when the vehicle is stopped by the abnormal state driving control part 28, the door lock control part 25 unlocks the door 2a determined by the safety determination part 27 to be safe and does not unlock the door 2a determined by the safety determination part 27 not to be safe. As a result, when the vehicle 2 enters a specific abnormal state, it becomes possible to secure safety when the user 4 gets off from the vehicle 2. Below, the control device of the vehicle according to the present embodiment will be explained in detail.

Flow Chart

Figure 7:
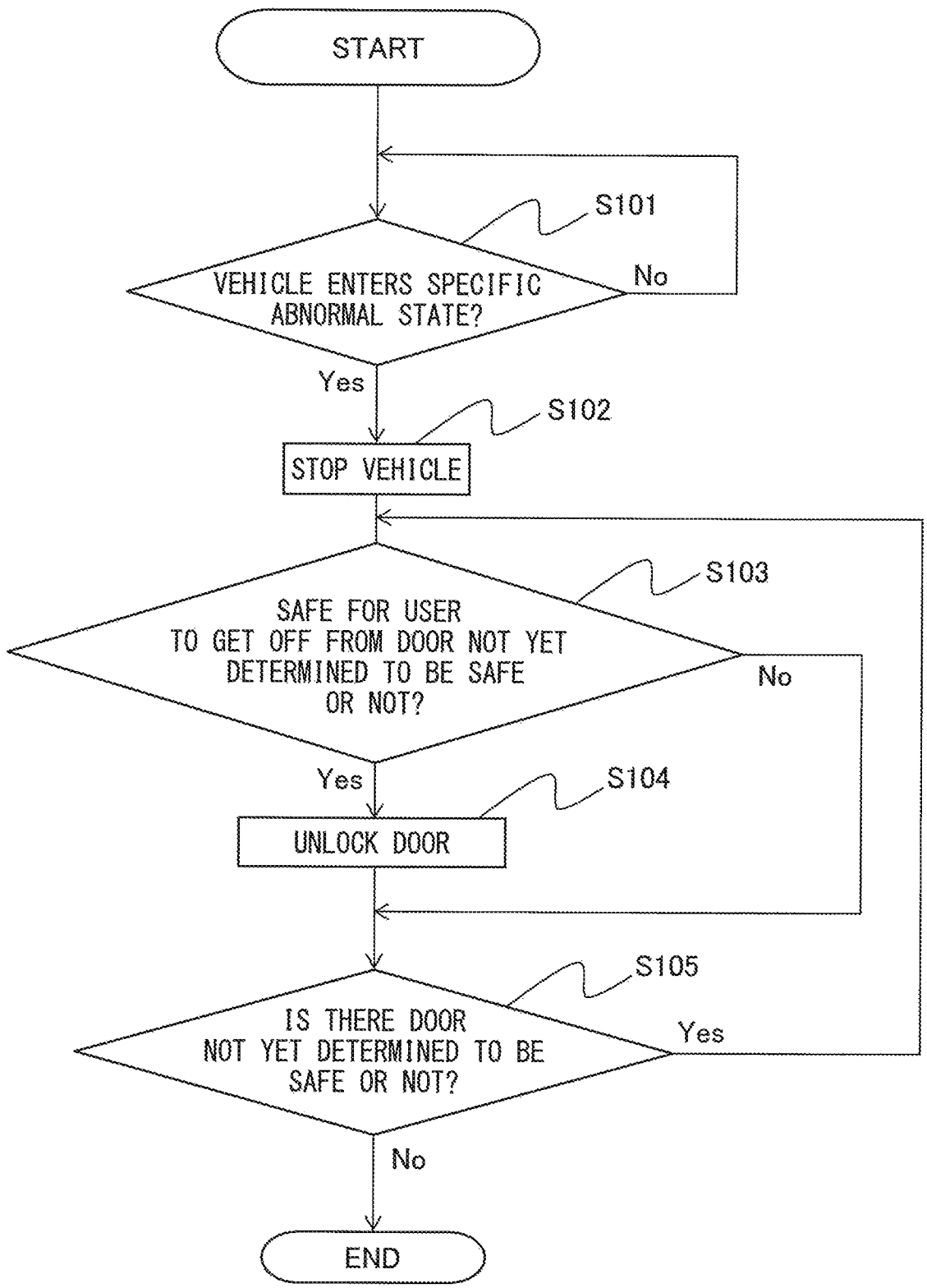
FIG. 7 is a flow chart showing a control routine in a control device of a vehicle according to the first embodiment.

FIG. 7 is a flow chart showing a control routine in the control device of the vehicle according to the present embodiment. The flow of the present control routine is realized by the processor of the control part 23 of the in-vehicle device 3 running a program stored in the storage part 22 of the in-vehicle device 3. The present control routine is, for example, performed by the control part 23 of the in-vehicle device 3 during steps S9 to S10 in FIG. 6, that is, while the vehicle 2 is traveling toward the destination. In the present embodiment, the doors 2a of the vehicle 2 are in the locked state while the vehicle 2 is being driven or at the time of a temporary stop, waiting for a change of a traffic light, or otherwise when the vehicle 2 is stopped.

At step S101, the abnormality determination part 26 determines if the vehicle 2 has entered a specific abnormal state. Here, the "specific abnormal state" means a state where the vehicle 2 is liable to be unable to continue suitable autonomous driving, such as, a state where an abnormality is detected in the various detection devices (for example, outside camera, milliwave radar, LIDAR, etc.) or various sensors (for example, ultrasonic wave sensor, vehicle speed sensor, etc.) used for automated driving control of the vehicle 2, driving actuator 56, the engine, motor, brake, etc., a state where collision with another vehicle or an obstacle etc. is detected, a state where the air pressure of a tire of the vehicle 2 is a predetermined value or less, or a state of receiving a notification from the user 4 or the outside server. The types of abnormal states covered by such determination are set in advance.

The determination of whether such a specific abnormal state has been entered is, for example, performed based on the state of the vehicle 2 detected by the vehicle status detection device 52. Collision with other vehicles or obstacles etc. and malfunctions of the various detection devices, various sensors, driving actuator 56, etc. are detected by known methods.

If at step S101 it is determined that the vehicle 2 has entered a specific abnormal state, the present control routine proceeds to step S102. On the other hand, if at step S101 it is determined that the vehicle 2 has not entered a specific abnormal state, step S101 is repeated.

Next, at step S102, the abnormal state driving control part 28 makes the vehicle 2 stop. In the present embodiment, the abnormal state driving control part 28, for example, uses the position information of the vehicle 2, the map information, the surrounding information, etc. to perform control for avoiding danger. Specifically, the abnormal state driving control part 28 makes the hazard lights of the vehicle 2 flash while controlling the driving actuator 56 of the vehicle 2 to cause the vehicle speed to gradually fall and make the vehicle 2 approach and stop at, for example, the sidewalk or road side or other location safe for the user 4 to get off the vehicle. Note that, for example, if a malfunction of the driving actuator 56 etc. makes it impossible to make the vehicle 2 approach a safe location, the abnormal state driving control part 28 may also make the hazard lights of the vehicle 2 flash while causing the vehicle speed to gradually fall and making the vehicle stop.

Next, at step S103, the safety determination part 27 determines if it would be safe for the user 4 of the vehicle 2 to get off a door 2a for each door 2a of the vehicle 2 while the vehicle is stopped by the abnormal state driving control part 28. This determination of whether it is safe to get off the vehicle is performed based on, for example, position information relating to the stopped position of the vehicle 2, map information, and surrounding information. In surrounding information, in particular, the white line of a road and information on other vehicles, motorcycles, bicycles, etc. are used for this determination.

Specifically, the safety determination part 27, for example, determines for each door 2a of the vehicle 2 whether it would be safe for the user 4 to get off the vehicle based on whether the door 2a adjoins a safe location. The safety determination part 27, for example, determines that it would be safe for the user 4 to get off the vehicle for a door at a side adjoining a sidewalk, road shoulder, road side, or other predetermined safe location where other vehicles basically will not be driving. On the other hand, the safety determination part 27, for example, determines that it would not be safe for the user 4 to get off the vehicle for a door at a side adjoining a roadway or other predetermined location where safety cannot be secured such as where other vehicles are basically being driven.

Alternatively, the safety determination part 27 may determine if it would be safe for the user 4 to get off the vehicle within a predetermined time after the vehicle is stopped by the abnormal state driving control part 28 based on whether another vehicle, motorcycle, bicycle, etc. is running near the door 2a. Even if the door is at the side adjoining a predetermined location for which safety is not secured, the safety determination part 27 may determine it is safe for the user 4 to get off the vehicle, for example, if no other vehicle, motorcycle, bicycle, etc. is detected or estimated to be running near the vehicle 2 by a known method based on surrounding information. Further, even if the door is at the side adjoining a predetermined safe location, the safety determination part 27 may determine it is not safe for the user 4 to get off the vehicle, for example, if a motorcycle, bicycle, etc. is detected or estimated to be running near the vehicle 2 by a known method based on surrounding information.

Further, after the elapse of a predetermined time, the safety determination part 27 may again determine a door 2a already determined for whether it is safe to get off at step S103 so as to determine if it is safe for the user of the vehicle 2 to get off from that door 2a. In this case, if a door 2a determined to not be safe to get off at step S103 is determined safe to get off in this repeat determination, the routine proceeds to step S104. Further, even for a door 2a determined to be safe to get off at step S103, if it is determined not to be safe to get off in this repeat determination in a state where the user 4 is not detected as having gotten off the vehicle by the vehicle get-on/get-off detector 57, the door lock control part 25 may output a door lock signal. Receiving this door lock signal, the door lock mechanism 54 may lock the door 2a determined not to be safe to get off.

Note that, if at step S101 a detection device or sensor is detected to be malfunctioning, at step S103, the safety determination part 27 may determine if it is safe to get off the vehicle, by using another detection device or sensor besides the detection device or sensor detected to be malfunctioning.

If at step S103 it is determined that it is safe to get off, the present control routine proceeds to step S104. At step S104, the door lock control part 25 outputs a door unlock signal. Receiving this door unlock signal, the door lock mechanism 54 unlocks the door 2a determined to be safe to get off at step S103. After step S104, the present control routine proceeds to step S105.

On the other hand, if at step S103 it is determined that it is not safe to get off, the routine proceeds to step S105. Therefore, a door 2a determined to not be safe to get off at step S103 is not unlocked but is maintained in the locked state.

At step S105, the safety determination part 27 determines if there is a door 2a for which it was not determined if it would be safe to get off at step S103. If at step S105 it is determined that there is a door not yet determined, the present control routine returns to step S103. Further, at step S103, the safety determination part 27 determines for the door 2a not determined for whether it is safe to get off if in the above way it would be safe for the user 4 of the vehicle 2 to get off from that door 2a. On the other hand, if at step S105 it is determined that there is no door not yet determined, the present control routine ends.

In the present embodiment, after the control routine shown in FIG. 7 ends, the unlocked door 2a is automatically opened. However, the user 4 may also open this unlocked door 2a.

Note that, in the present embodiment, each door 2a was unlocked at step S104 in accordance with the results of determination of step S103, but, for example, after step S105, it is also possible to simultaneously unlock all of the doors 2a determined to be safe to get off at step S103.

Second Embodiment

Next, a control device of the vehicle according to a second embodiment will be explained. The configuration of the control device of the vehicle according to the second embodiment is basically the same as the configuration of the control device of the vehicle according to the first embodiment. Below, the parts different from the configuration of the control device of the vehicle according to the first embodiment will be focused on in the explanation. In the first embodiment, the unlocked door 2a was automatically opened, but in the present embodiment, this unlocked door 2a is not automatically opened. The user opens the unlocked door 2a.

Figure 8:
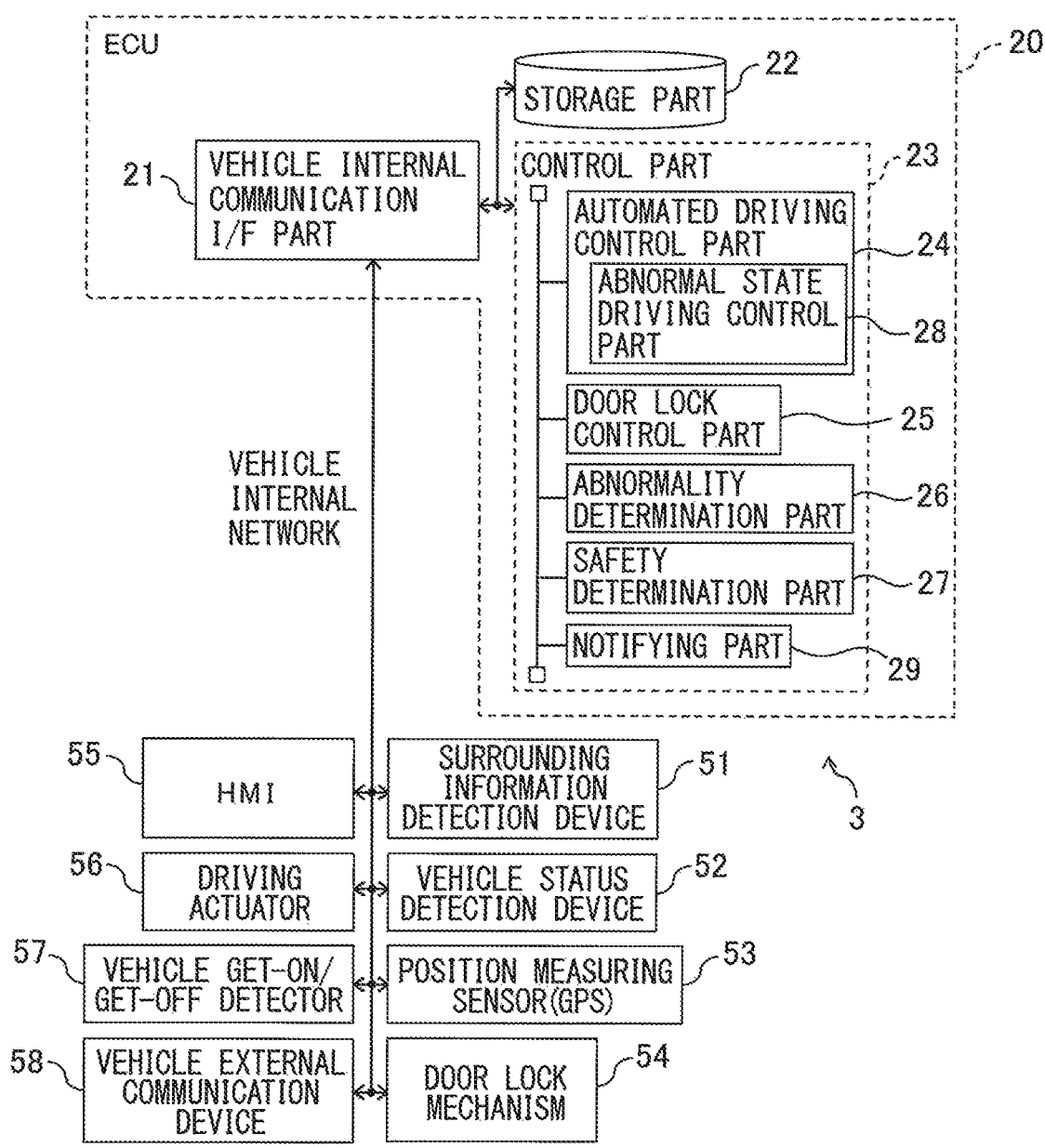
FIG. 8 is a schematic view of the configuration of an in-vehicle device according to a second embodiment.

FIG. 8 is a schematic view of the configuration of the in-vehicle device 3 according to the present embodiment. As shown in FIG. 8, the control part 23 of the ECU 20 further includes a notifying part 29 as a functional module.

In the present embodiment, the notifying part 29 notifies the user 4 of the door 2a unlocked by the door lock control part 25 while the vehicle is stopped by the abnormal state driving control part 28. As a result, for example, when the vehicle 2 enters a specific abnormal state and is stopped, the user 4 of the vehicle 2 can grasp the unlocked door 2a. And therefore, even in such a case, since the user 4 can smoothly exit the car, convenience to the user 4 is improved. Below, the present embodiment will be explained in detail.

Flow Chart

Figure 9:
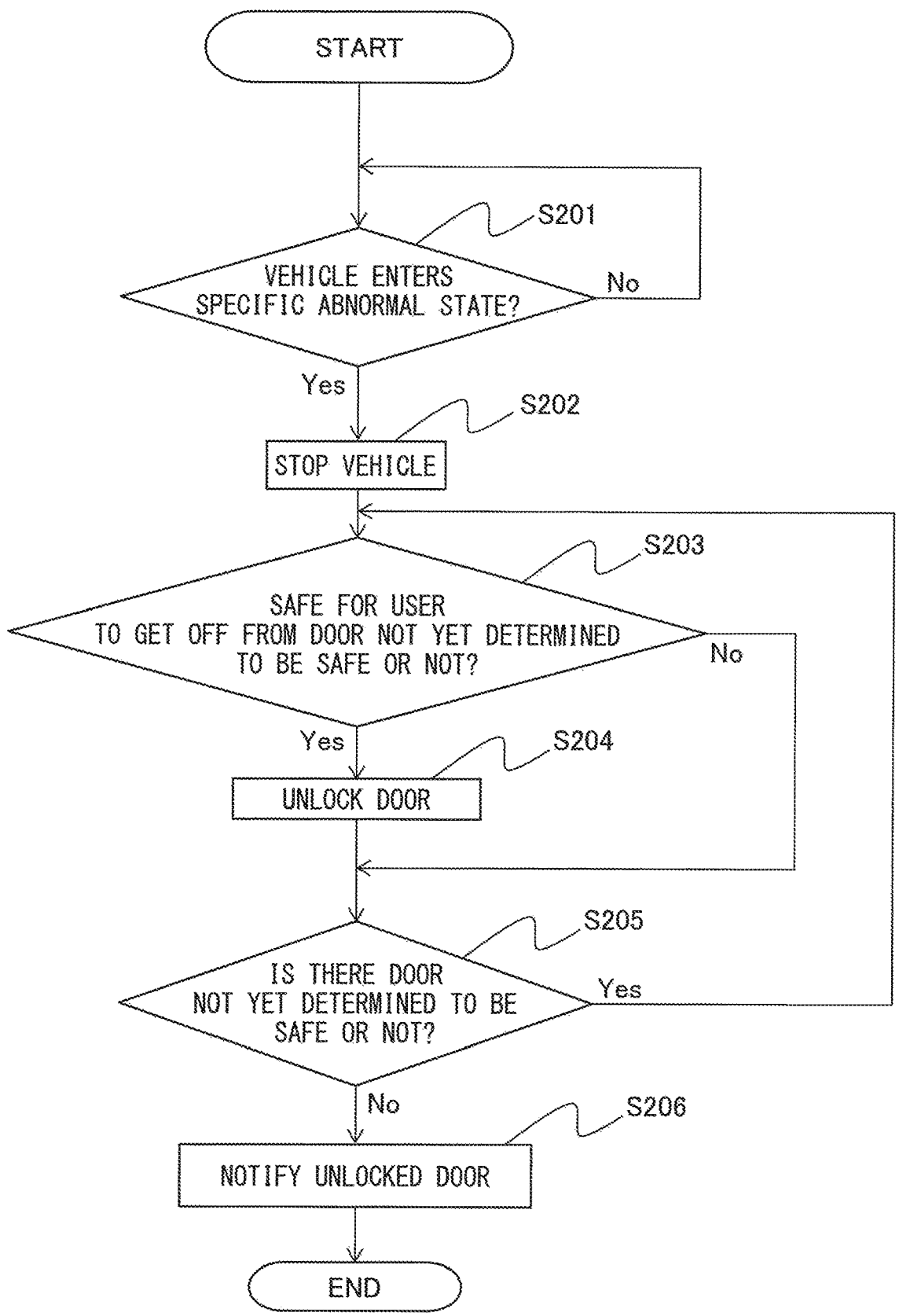
FIG. 9 is a flow chart showing a control routine in a control device of a vehicle according to the second embodiment.

FIG. 9 is a flow chart showing the control routine in the control device of the vehicle according to the present embodiment. The flow of the present control routine is realized by the processor of the control part 23 of the in-vehicle device 3 running the program stored in the storage part 22 of the in-vehicle device 3. Note that, steps S201 to S204 of FIG. 9 are respectively similar to steps S101 to S104 of FIG. 7, and therefore explanations will be omitted.

At step S205, it is determined if there is a door 2a not determined to be safe or not at step S203. If at step S205 it is determined that there is a door not yet determined, the present control routine proceeds to step S206.

At step S206, the notifying part 29 notifies the door 2a which has been unlocked by the door lock control part 25 to the user 4. At step S206, the notifying part 29 may also, for example, display a top image of the vehicle 2 on the HMI 55 provided at the seat of the user 4, then display the position of the unlocked door 2a on the top image. Further, the notifying part 29 may also, for example, light up the HMI 55 provided near the unlocked door 2a to thereby show that the door has been unlocked.

Furthermore, the notifying part 29 may also send door lock information indicating the unlocked door 2a and notifications and instructions through the server 30 to the mobile terminal 40 to thereby notify the unlocked door 2a to the user 4 through the user I/F part 41 of the mobile terminal 40. Further, the unlocked door 2a may also be notified together with vibration of the mobile terminal 40.

Further, at step S206, the notifying part 29 may notify the user 4 about not only an unlocked door 2a, but also a not unlocked door 2a. For example, the notifying part 29 may also display a top image of the vehicle 2 on the HMI 55 in the same way as above and then show the positions of the unlocked door 2a and the not unlocked doors 2a at this top image. Further, the notifying part 29, for example, may notify the user 4 of the unlocked door 2a and not unlocked doors 2a by making HMIs 55 provided near the unlocked door 2a and not unlocked doors 2a flash by different colors or lighting patterns.

After step S206, the present control routine ends.

Third Embodiment

Next, a control system of a vehicle according to a third embodiment will be explained. The configurations of the in-vehicle device 3 and the server 30 according to the third embodiment are basically the same as the configuration of the server 30 according to the first embodiment. Below, the parts different from the configurations of the in-vehicle device 3 and the server 30 according to the first embodiment will be focused on in the explanation.

Figure 10:
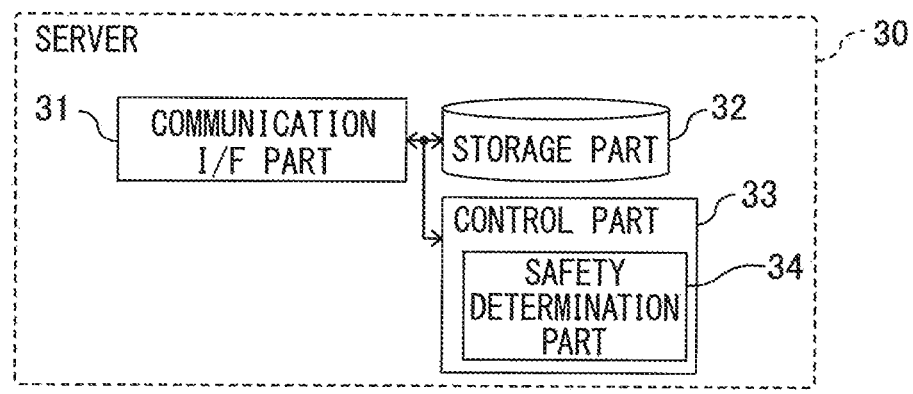
FIG. 10 is a schematic view of the configuration of a server according to a third embodiment.

FIG. 10 is a schematic view of the configuration of the server 30 according to the present embodiment. As shown in FIG. 10, the control part 33 of the server 30 includes a safety determination part 34 as a functional module. Further, the storage part 32 of the server 30 stores not only map information etc. but also position information of other vehicles.

In the above embodiments, the safety determination part 27 of the in-vehicle device 3 determines if it would be safe for the user 4 to exit the vehicle, but in the present embodiment, the safety determination part 34 of the server 30 determines if it would be safe. Below, the present embodiment will be explained in detail.

Flow Chart

FIG. 11 is a flow chart showing a control routine of the in-vehicle device 3 in the control system of the vehicle according to the present embodiment. The flow of the present control routine is realized by the processor of the control part 23 of the in-vehicle device 3 running a program stored in the storage part 22 of the in-vehicle device 3. Note that, steps S301 and S302 of FIG. 11 respectively are similar to steps S101 and S102 of FIG. 7, and therefore explanations will be omitted.

At step S303, the safety determination part 27 sends to the server 30 a safety determination request for the door 2a of the vehicle 2 requesting that it be determined if it would be safe for the user 4 of the vehicle 2 to get off from the door 2a and position information and surrounding information relating to the stopping position of the vehicle 2. After that, the present control routine proceeds to step S304.

At step S304, the safety determination part 27 determines if it has received the results of determination explained later using FIG. 12 from the server 30 for all of the doors 2a. If it is determined that it has received the results of determination for all of the doors 2a, the present control routine proceeds to step S305. On the other hand, if at step S304 it is determined that it has not received the results of determination for all of the doors 2a, step S304 is repeatedly performed.

At step S305, the door lock control part 25 generates and outputs a door unlock signal based on the received results of determination. Receiving this door unlock signal, the door 2a determined to be safe to get off at step S401 is unlocked by the door lock mechanism 54. Further, the doors 2a determined to not be safe to get off at step S401 are kept locked. After step S305, the present control routine ends.

FIG. 12 is a flow chart showing a control routine of the server 30 in the control system of the vehicle according to the present embodiment. The flow in the present control routine is realized by the processor of the control part 33 of the server 30 running a program stored in the storage part 32 of the server 30. The present control routine is performed by the control part 33 of the server 30 if the server 30 receives a safety determination request sent from the safety determination part 27 of the in-vehicle device 3 at step S303 of FIG. 11.

At step S401, the safety determination part 34 of the server 30 determines for the door 2a of the vehicle 2 if it would be safe for the user 4 of the vehicle 2 to get off that door 2a based on the position information and surrounding information received from the in-vehicle device 3 and the map information and position information of other vehicles stored in the storage part 32 of the server 30. In the present embodiment, by determining safety by using, in addition to position information, surrounding information and map information relating to the stopping position of the vehicle 2, the position information of the other vehicles, it becomes possible to determine such safety more suitably.

If at step S401 it is determined that it is safe to get off, the present control routine proceeds to step S402. At step S402, the safety determination part 34 of the server 30 sends the result of determination of it being safe to get off to the in-vehicle device 3 for the door 2a determined to be safe to get off at step S401. After that, the present control routine proceeds to step S404.

On the other hand, if at step S401 it is determined that it is not safe to get off, the present control routine proceeds to step S403. At step S404, the safety determination part 34 of the server 30 sends the result of determination of it not being safe to get off to the in-vehicle device 3 for the door 2a determined not to be safe to get off at step S401. After that, the present control routine proceeds to step S404.

At step S404, the safety determination part 34 of the server 30 determines if there is a door 2a for which safety was not determined at step S401. If at step S404 it is determined that there is such a door not yet determined, the present control routine returns to step S401. On the other hand, if at step S404 it is determined that there is no such door not yet determined, the present control routine ends.

REFERENCE SIGNS LIST 2. vehicle
3. in-vehicle device
20. ECU
30. server
40. mobile terminal
24. automated driving control part
25. door lock control part
26. abnormality determination part
27, 34. safety determination part
28, abnormal state driving control part
29. notifying part

What is claimed is:

1. A control system of a vehicle comprising an in-vehicle device mounted in a vehicle configured to autonomously drive and a server, the in-vehicle device being configured to:

control a door lock mechanism locking a door of the vehicle;

determine whether the vehicle is in a specific abnormal state; and make the vehicle stop in response to determining that the vehicle is in the specific abnormal state, and the server is configured to send the in-vehicle device a result of determination of if exiting the vehicle from the door of the vehicle is safe for a user of the vehicle while the vehicle is stopped after determining that the vehicle is in the specific abnormal state, wherein the in-vehicle device controls the door lock mechanism such that a door is maintained in a locked state while the vehicle is being driven and while the vehicle is stopped after determining that the vehicle is not in the specific abnormal state, and while the vehicle is stopped after determining that the vehicle is in the specific abnormal state, the in-vehicle device unlocks the door in response to receiving determination that exiting the vehicle from the door is safe for the user of the vehicle, and does not unlock the door in response to receiving determination that exiting the vehicle from the door is not safe for the user of the vehicle.

2. The control system according to claim 1, wherein the specific abnormal state is one of a state where an abnormality is detected in a detection device or a sensor used for automated driving control of the vehicle, a state where collision with another vehicle or an obstacle is detected, a state where an air pressure of a tire of the vehicle is a predetermined value or less, and a state of receiving a notification from a user or an outside server.

* * * * *